(12) United States Patent
Schreiber et al.

(10) Patent No.: US 8,251,830 B2
(45) Date of Patent: Aug. 28, 2012

(54) ENGINE SHAFT FOR A GAS-TURBINE ENGINE

(75) Inventors: Karl Schreiber, Am Mellensee (DE); Raimund Grothaus, Dresden (DE)

(73) Assignee: Rolls-Royce Deutschland Ltd Co KG (DE)

( * ) Notice: Subject to any disclaimer, the term of this patent is extended or adjusted under 35 U.S.C. 154(b) by 181 days.

(21) Appl. No.: 12/613,238

(22) Filed: Nov. 5, 2009

(65) Prior Publication Data

US 2010/0113170 A1      May 6, 2010

(30) Foreign Application Priority Data

Nov. 5, 2008   (DE) .................... 10 2008 056 018

(51) Int. Cl.
*F16C 3/02* (2006.01)
*F04D 29/054* (2006.01)
(52) U.S. Cl. .............. 464/181; 464/183; 415/216.1
(58) Field of Classification Search .............. 464/181, 464/183; 138/109, 172; 416/244 A; 415/216.1
See application file for complete search history.

(56) References Cited

U.S. PATENT DOCUMENTS

| | | | | |
|---|---|---|---|---|
| 4,362,521 A | * | 12/1982 | Puck et al. ............... | 464/181 |
| 4,983,240 A | * | 1/1991 | Orkin et al. | |
| 5,112,189 A | * | 5/1992 | Halek ............... | 415/216.1 |
| 5,601,493 A | * | 2/1997 | Nakazono et al. .......... | 464/181 |
| 5,851,152 A | * | 12/1998 | Ilzhofer et al. ............... | 464/181 |
| 6,682,436 B2 | * | 1/2004 | Kimoto et al. ............... | 464/181 |
| 8,002,781 B1 | * | 8/2011 | Dermody, IV | |
| 2002/0117228 A1 | * | 8/2002 | Nakajima et al. ............. | 464/181 |

FOREIGN PATENT DOCUMENTS

| | | |
|---|---|---|
| DE | 3888265 | 6/1994 |
| DE | 19613857 | 10/1997 |
| EP | 0307112 | 3/1994 |
| EP | 0637280 | 9/1996 |
| EP | 1231391 | 8/2002 |

OTHER PUBLICATIONS

German Search Report dated Nov. 5, 2008 from counterpart German patent application.

* cited by examiner

*Primary Examiner* — Gregory Binda
*Assistant Examiner* — Josh Skroupa
(74) *Attorney, Agent, or Firm* — Timothy J. Klima; Shuttleworth & Ingersoll, PLC

(57) ABSTRACT

A low-pressure turbine shaft (11) for a gas-turbine engine includes a fiber-composite plastic tube (13) with fiber layers provided in an inner wall area for taking up and transmitting torsional forces, and, in an outer wall area, with fiber layers suitably oriented for influencing stiffness and damping characteristics. The fiber layers are embedded in a high temperature resistant plastic matrix. A load input element (14) is an attachment flange (24) made of fiber-composite plastic material integrally formed on a fiber-composite plastic tube (13). A load output element (15) is a metallic driven protrusion inseparably connected to the fiber layers transmitting the torsional forces. Alternatively, the load input element may be provided as a metallic driving protrusion, which is firmly connected to the fiber layers taking up the torsional forces.

11 Claims, 3 Drawing Sheets

Radius of low-pressure turbine shaft

ENGINE SHAFT FOR A GAS-TURBINE ENGINE

Figure 1:
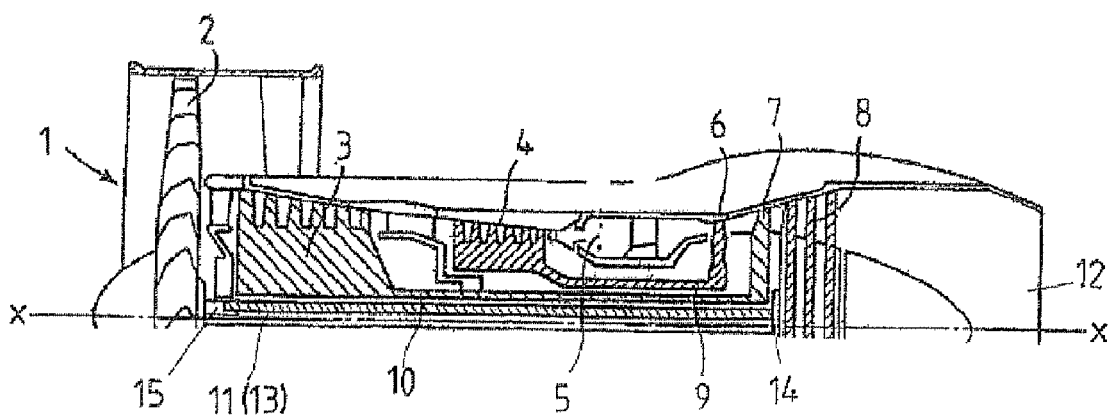

This application claims priority to German Patent Application DE 102008056018.9 filed Nov. 5, 2008, the entirety of which is incorporated by reference herein.

This invention relates to an engine shaft, in particular a low-pressure turbine shaft or a radial shaft for a gas-turbine engine, which is designed as a hollow body and provided with a load input element on a driving side and a load output element on a driven side.

A known multi-spool bypass gas-turbine engine has, arranged in the following sequence in the direction of flow, for example an air inlet, a fan, an intermediate-pressure compressor and a high-pressure compressor, a combustion chamber, a high-pressure turbine, an intermediate-pressure turbine and a low-pressure turbine. The high-pressure turbine, the intermediate-pressure turbine and the low-pressure turbine are connected to the high-pressure compressor, the intermediate-pressure compressor and the fan via concentrically arranged drive shafts, i.e. a high-pressure turbine shaft, an intermediate-pressure turbine shaft and a low-pressure turbine shaft. The fan produces a first airflow, or bypass flow, which provides propulsive thrust and a second airflow which is initially compressed in the intermediate-pressure compressor and then further compressed in the high-pressure compressor. The high-pressure turbine, the intermediate-pressure turbine and the low-pressure turbine are driven by the expanding gases released from the combustion chamber, with the gases discharged from the engine via a nozzle providing for additional propulsive thrust.

The low-pressure turbine shaft (low-pressure shaft), which is arranged concentrically to the hollow intermediate-pressure turbine shaft—or to the high-pressure turbine shaft on a two-spool gas-turbine engine—and is provided at its ends with rigidly attached coupling elements (load input element, load output element) for connection to the fan and the low-pressure turbine and transmission of high loads, has smaller diameter, greater length, lower speed and higher loading than the other two shafts. Accordingly, the low-pressure turbine shaft is a highly loaded, critical engine component which, on the one hand, shall not fail under any circumstances and, on the other hand, shall have smallest possible outer diameter to permit the use of turbine disks with smallest possible inner diameter to provide lightweight and powerful turbines. The low-pressure turbine shaft, which is usually made of steel or a nickel-base material and is forged and hollowed out, is expensive to manufacture and also heavy. In enhancing aircraft engines, an inward increase of the wall thickness of the low-pressure turbine shaft is the only way to enable the latter to transmit higher torques and attain greater length, higher speed and high stiffness with limited, smallest possible outer diameter. However, this will cause the natural frequency of the low-pressure shaft to fall and approach the natural frequency of the engine, with the consequence that, besides a higher weight of the low-pressure shaft, an increase in vibration is likely, incurring the hazard of damage or destruction of the low-pressure turbine shaft.

The requirements on the low-pressure turbine shaft apply similarly to the radial shaft connecting an external and internal gear drive, with the radial shaft being driven at both ends, although always in the same direction. As a consequence, different torques are applied to the radial shaft. Like the low-pressure shaft, the radial shaft must be designed as slender as possible.

In a broad aspect, the present invention provides for a design of the low-pressure turbine shaft or the radial shaft for a gas-turbine engine which enables high torques to be reliably transmitted while featuring reduced weight and limited outer diameter.

The present invention, in its essence, provides for a design of the respective engine shaft in the form of a fiber-composite plastic tube made of different fiber layers which—preferably in the case of the low-pressure turbine shaft—is provided, for load input, with an attachment flange in fiber-composite plastic material integrally formed on via a flaring tube section or a metallic driving protrusion inseparably incorporated in the fiber-composite structure and, for load output, with a metallic driven protrusion located at the other shaft end and inseparably incorporated in the fiber-composite structure. Furthermore, an essential concept of the present invention is to provide for a particular orientation of the fibers in the several fiber layers, actually such that the fiber layers starting out from the inner wall of the fiber-composite plastic tube are disposed at an angle suitable for taking up and transmitting torsional forces, while the fiber layers provided in the outer wall area are disposed at an angle providing for the stiffness of the fiber-composite tube. While the outer fiber layers, with an angle ranging between +/−12° and +/−5°, largely extend in the direction of the shaft axis, the fiber layers adjoining towards the inner wall, with an angle between +/−45° and +/−35°, are significantly more transversely oriented to the longitudinal axis. Orienting the fibers in the respective radius area allows the low-pressure turbine shaft to be variably designed and adapted to the respective engine performance with regard to stiffness, natural frequency and damping as well as with regard to the torsional forces to be transmitted. Integral incorporation of the metallic driving and driven protrusions into the torsional force-transmitting inner fiber layers provides for safe output of load. Manufacturing costs and weight of the low-pressure turbine shaft or the radial shaft, respectively, are low compared with metallic designs. In accordance with the loading of the low-pressure turbine shaft, a property profile of the low-pressure turbine shaft is generated in dependence of the orientation of the fiber layers which is decoupled with regard to transmittability of torsional forces and stiffness. In order to account for the different torques acting upon the radial shaft, the +/−45° fibers and the +/−35° fibers are simultaneously applied to form a fiber braid.

According to a preferred embodiment, the fiber-composite plastic tube includes a first, inner, carbon fiber layer and a second carbon fiber layer, adjoining the first layer, each arranged at an angle of +45° and −45°, a third and a fourth carbon fiber layer, each arranged at an angle of +35° and −35° as well as fifth and sixth-outer-carbon fiber layers, each arranged at an angle of +5° or −5° respectively.

In a further development of the present invention, a hose-type braid of fibers oriented at an angle of +45° and −45° is provided on the outer surface of the fiber-composite plastic tube. Preferably, the outermost fiber layer, which is provided for mechanical surface protection, is made of glass fibers.

According to a further feature of the present invention, the fiber layers are embedded in a high-temperature resistant plastic matrix preferably made of cyanate and/or phenolic resin and/or polyimides and/or polyetherether-ketones, in accordance with the temperature of the turbine shaft encountered in service.

The present invention is more fully described in light of the accompanying drawings showing a preferred embodiment. In the drawings, FIG. 1 is a part-sectional view of a three-spool gas-turbine engine in highly simplified manner, FIG. 2 is a sectional view of a low-pressure turbine shaft of the hybrid type, FIG. 3 is a detailed representation of the wall of the low-pressure turbine shaft shown in FIG. 2, and FIG. 4 is a graphical representation of the stress distribution versus the wall thickness or the radius of the low-pressure turbine shaft, respectively.

The gas-turbine engine shown in FIG. 1 has, arranged in the following sequence in the direction of flow, an air inlet 1, a fan 2, an intermediate-pressure compressor 3, a high-pressure compressor 4, a combustion chamber 5 as well as a turbine arrangement including a high-pressure turbine 6, an intermediate pressure turbine 7 and a low-pressure turbine 8. The high-pressure turbine 6 is connected to the high-pressure compressor via a high-pressure turbine shaft 9, while the intermediate-pressure compressor 3 is coupled to the intermediate-pressure turbine 7 via an intermediate-pressure turbine shaft 10. A low-pressure turbine shaft 11 connects the low-pressure turbine 8 to the fan 2 of the engine. The fan 2, which is driven by the low-pressure turbine 8, accelerates the air entering at the air intake 1 and delivers an outer airflow which provides the majority of propulsive thrust and an inner airflow which is initially compressed in the intermediate-pressure compressor 3 and then further compressed in the high-pressure compressor 4 before entering the combustion chamber 5. The combustion products released from the combustion chamber 5 drive the high-pressure turbine 6, the intermediate-pressure turbine 7 and the low-pressure turbine 8 before they are ejected through the nozzle 12, thereby producing additional propulsive thrust.

The highly-stressed low-pressure turbine shaft 11, which is supported at two points in bearing arrangements and, in the present example, has a maximum outer diameter of 100 mm and a length of 2 m, includes a fiber-composite plastic tube 13 which is provided at its one end with a load input element 14 connected to a rotor disk of the low-pressure turbine 8 and at its other end with a load output element 15 connected to the fan 2. The fiber-composite plastic tube 13 with the associated load input and load output elements 14, 15 is designed such that the low-pressure turbine shaft 11 features high natural frequency and stiffness as well as vibration-damping properties while being capable of taking up and transmitting high torsional forces and also being resistant to temperatures of up to approx. 400° C. existing in this engine area.

Figure 2:
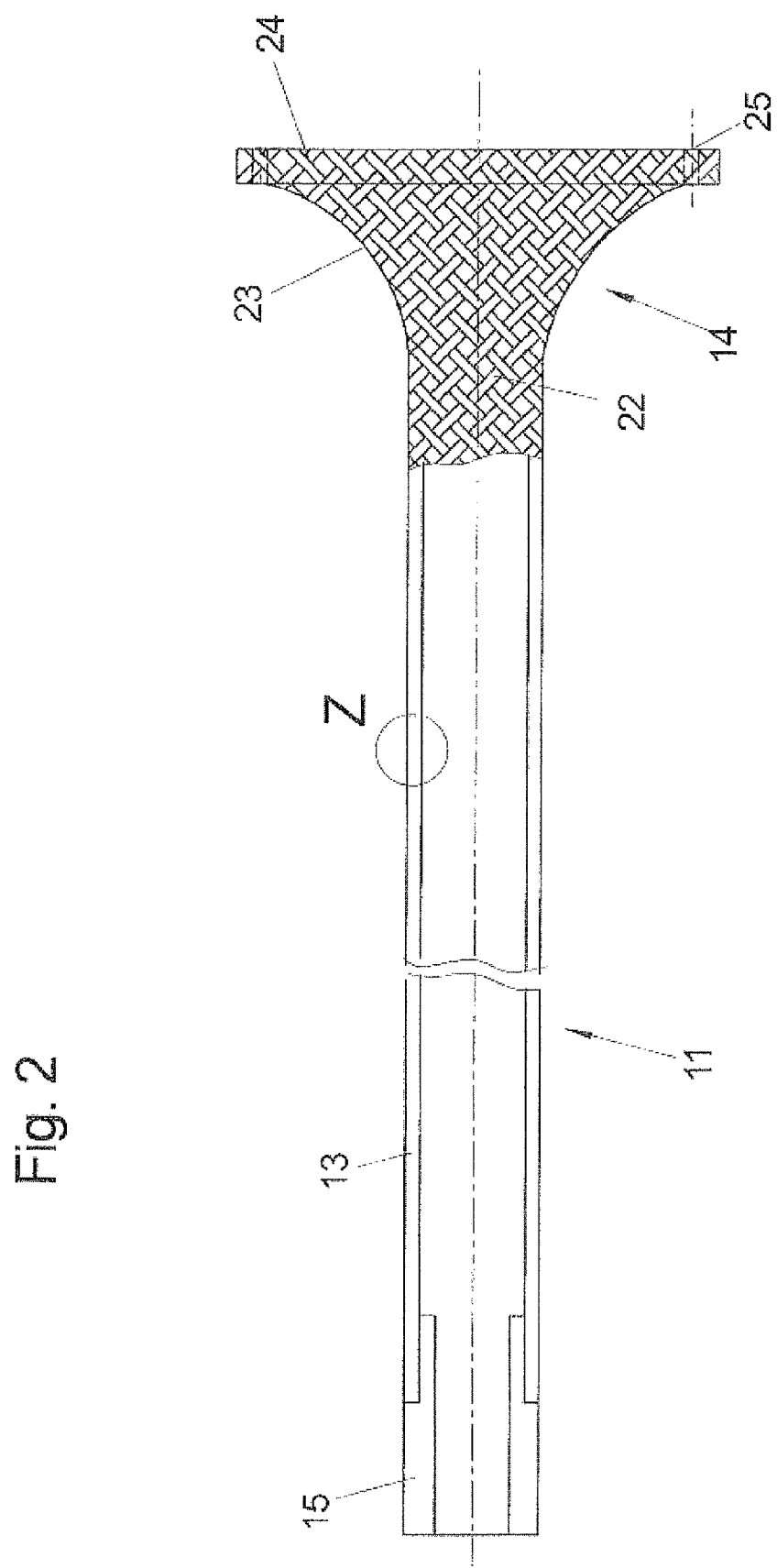
Figure 3:
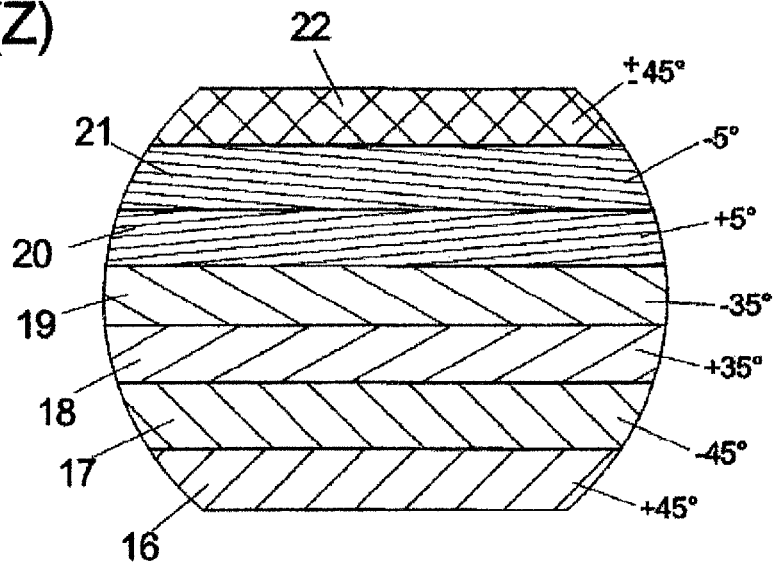
Figure 4:
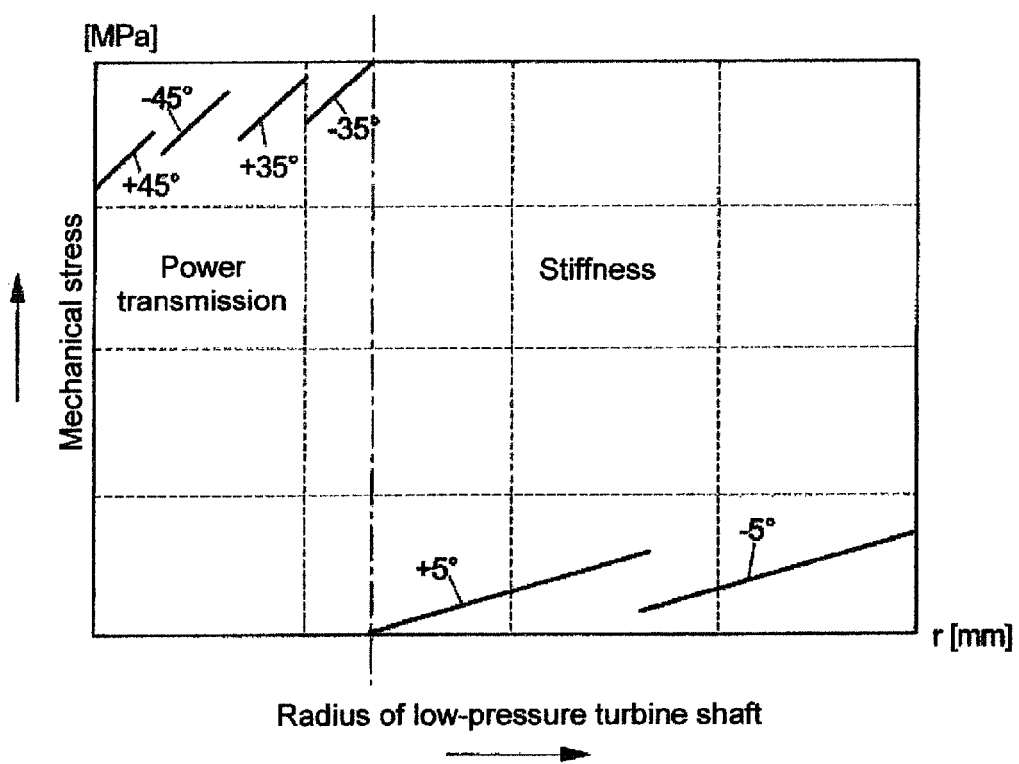

As can be seen in FIG. 3 in a sectional view of the tube wall, detail Z from FIG. 2, the fiber-composite plastic tube 13 includes several differently oriented carbon fiber layers 16 to 21 and glass fiber layer 22 embedded in a matrix of high-temperature resistant plastic material, for example cyanide resin and/or phenolic resin and/or polyimides, to generate a property profile which is dependent on the fiber direction and decoupled with regard to the loading of the low-pressure turbine shaft. The fiber-composite plastic tube 13 includes, from the inner surface to the outer surface, a first (inner)+45° carbon fiber layer 16, a second −45° carbon fiber layer 17, a third +35° carbon fiber layer 18, a fourth −35° carbon fiber layer 19, a fifth +5° carbon fiber layer 20, a sixth −5° carbon fiber layer 21 and a seventh (outer)+/−45° glass fiber layer 22, each embedded in the high-temperature resistant synthetic resin system.

According to the graph in FIG. 4 showing the stress development in the low-pressure turbine shaft 11 versus the radius, the first four carbon fiber layers 16 to 19, which, starting out from the inner surface, lie in an area of high stress and are oriented in +45° and −45° direction as well as in +35° and −35° direction, take up torsional forces for power transmission from the low-pressure turbine 8 to the fan 2, while the two carbon fiber layers 20 and 21 adjoining towards the outer surface and oriented in +5° and −5° direction relative to the longitudinal axis of the low pressure-turbine shaft 11 provide for high stiffness, natural frequency and vibration attenuation of the low-pressure turbine shaft 11. The glass fiber layer 22 applied on the outer circumference of the low-pressure turbine shaft 11 is a hose of glass fibers braided at an angle of +/−45° and also embedded in a matrix of a high-temperature resin system to provide external, mechanical protection of the low-pressure turbine shaft 11.

According to the part-sectional representation of the low-pressure turbine shaft 11 in FIG. 2, the load input element 14 thereof includes a gradually flaring arched tube section 23 which is integrally formed on the fiber-composite plastic tube 13 and provided at its end with an attachment flange 24 in which through-holes 25 (in phantom) are provided for its attachment to the rotor disk of the low-pressure turbine 8. The load output element 15 is a metallic shaft protrusion which is firmly and inseparably connected to the inner surface of the fiber-composite plastic tube 13 and transfers the torsional forces transmitted by the fiber-composite plastic tube 13 to the fan 2.

The present invention is not limited to the embodiment exemplified in the above. Also falling within the scope of the present invention is, for example, a load input element in the form of a metallic driving protrusion firmly connected to the fiber layers taking up the torsional forces.

LIST OF REFERENCE NUMERALS

1 Air inlet
2 Fan
3 Intermediate-pressure compressor
4 High-pressure compressor
5 Combustion chamber
6 High-pressure turbine
7 Intermediate-pressure turbine
8 Low-pressure turbine
9 High-pressure turbine shaft
10 Intermediate-pressure turbine shaft
11 Low-pressure turbine shaft
12 Nozzle
13 Fiber-composite plastic tube
14 Load input element
15 Load output element
16 First/inner +45° carbon fiber layer
17 Second −45° carbon fiber layer
18 Third +35° carbon fiber layer
19 Fourth −35° carbon fiber layer
20 Fifth +5° carbon fiber layer
21 Sixth −5° carbon fiber layer
22 Seventh/outer +/−45° glass fiber layer
23 Flaring tube section of 13
24 Attachment flange of 13
25 Through-holes

What is claimed is:

1. An engine shaft, comprising:
a load input element on a driving side;
a load output element on a driven side,
a fiber-composite plastic tube, interconnecting the load input element and the load output element, the fiber-composite plastic tube comprising fiber layers in an inner wall area oriented to take up and transmit torsional forces, and fiber layers in an adjoining outer wall area oriented to provide stiffness and natural frequency;
wherein the engine shaft is a hollow body and the load input element is a gradually flaring tube section of the fiber-composite plastic tube and an attachment flange formed on the plastic tube made of at least one of a fiber-composite plastic material and a metallic driving protrusion inseparably connected to the fiber layers taking up the torsional forces, and the load output element is a metallic driven protrusion inseparably connected to the fiber layers;

wherein the outer wall fiber layers are each disposed at an angle ranging between +5°/−5° and +12°/−12° inclusive essentially in a longitudinal direction of the shaft, while the inner wall fiber layers are each disposed at an angle ranging between +45°/−45° and +35°/−35° inclusive and are more transversely oriented to the longitudinal axis of the shaft;

wherein the engine shaft is a gas turbine engine shaft.

2. The engine shaft of claim 1, wherein the outer wall fiber layers are oriented at an angle ranging between +5°/−5° and +7°/−7° inclusive.

3. The engine shaft of claim 1, wherein the fiber layers are wound as fiber braid in the case of an engine shaft provided as a radial shaft.

4. The engine shaft of claim 1, wherein the fiber layers are carbon fiber layers, with the fibers being embedded in a high temperature resistant plastic matrix.

5. The engine shaft of claim 1, wherein a number of fiber layers provided for transmitting the torsional forces and achieving the required stiffness is selected depending on respective requirements for load transmission and stiffness.

6. The engine shaft of claim 1, wherein, with reference to a longitudinal axis of the fiber-composite plastic tube, for the transmission of torsional forces, a first inner carbon fiber layer is oriented at an angle of +45°, a second carbon fiber layer at an angle of −45°, a third carbon fiber layer at an angle of +35° and a fourth carbon fiber layer at an angle of −35°, and, for increasing the stiffness, a fifth carbon fiber layer is oriented at an angle of +5° and a sixth carbon fiber layer at an angle of −5°.

7. The engine shaft of claim 6, wherein, in a case of the radial shaft driven at both shaft ends, for transmission of the different torques applied to the latter, the first and second fiber layers as well as the third and fourth fiber layers each form a fiber braid.

8. The engine shaft of claim 4, wherein the plastic matrix is made of at least one of cyanate resin, phenolic resin, polyimides and polyetherether-ketones.

9. The engine shaft of claim 1, and further comprising a hose-type braid of fibers oriented at an angle of +/−45°, which additionally envelops the fiber-composite plastic tube.

10. The engine shaft of claim 9, wherein the hose-type braid is a glass fiber layer.

11. The engine shaft of claim 1, wherein the engine shaft is resistant to temperatures to approx. 400° C.

* * * * *